May 25, 1954   R. B. IMMEL ET AL   2,679,077
ENCLOSURE
Filed July 7, 1950
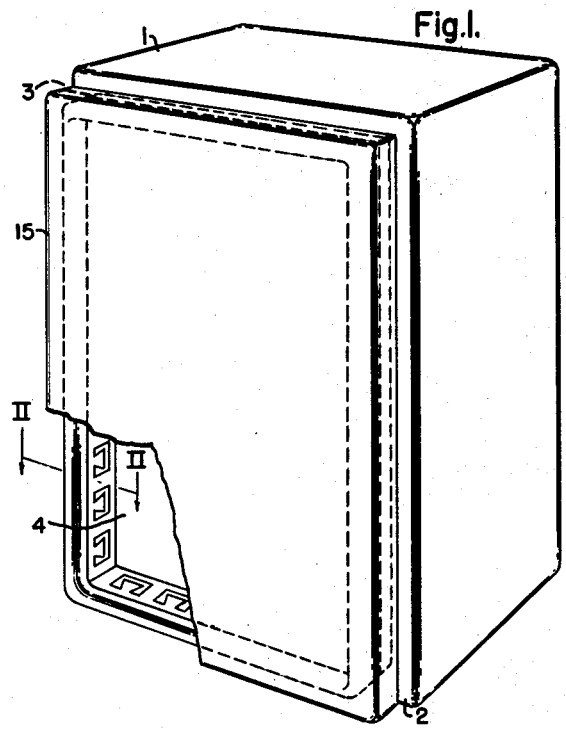
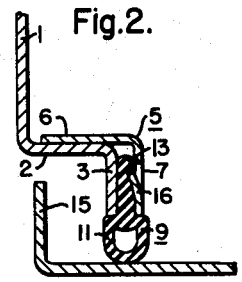
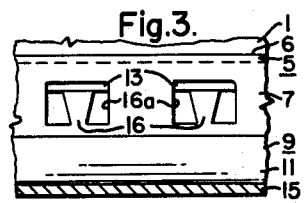
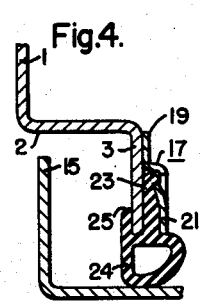
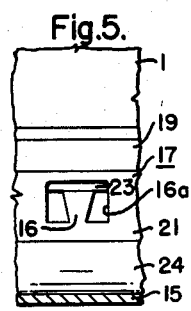
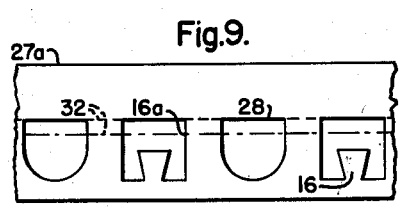
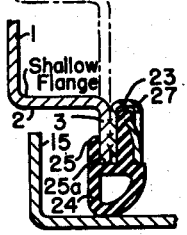
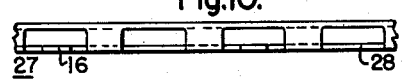
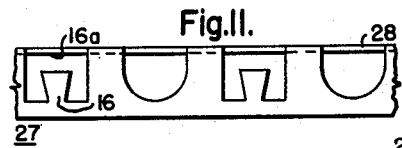
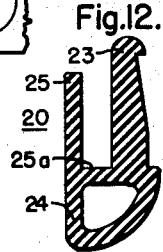
INVENTORS
Ralph B. Immel and
Reese T. Kintzing.
BY
Paul E. Friedemann
ATTORNEY
WITNESSES:

Patented May 25, 1954

2,679,077

UNITED STATES PATENT OFFICE 2,679,077

ENCLOSURE

Ralph B. Immel, Williamsville, and Reese T. Kintzing, Buffalo, N. Y., assignors to Westinghouse Electric Corporation, East Pittsburgh, Pa., a corporation of Pennsylvania Application July 7, 1950, Serial No. 172,521

1 Claim. (Cl. 20—69)

This invention relates generally to dustproof and water-tight enclosures, and more in particular to enclosures of this type embodying a simple and effective gasket means.

The application of adequate and simple gasketing in dust-tight and water-tight enclosures has always presented a problem. Some enclosures have metal channel retainers, and others employ cement means to retain the gasket in place. However, with the usual sponge rubber bar type of gasket, a relatively large force on the door is required to seal the parts. Also, if the cementing means fails, the rubber may stick to the door and be pulled out of place.

Some tubular section gaskets similar to those used in household refrigerators have been applied by cementing the rubber section directly to the cabinet flanges. However, the solvent in the cement dissolves the paint used in finishing the refrigerator or cabinet surfaces, and the cement must be applied to bare metal surfaces. This requires masking of the metal during painting to keep the gasket supporting surface bare. Additionally, it is necessary to clamp the gasket in position during the cementing operation for a period of several hours to secure a good bond between the metal and the rubber. This gasketing means is not too satisfactory inasmuch as masking tape must be applied before painting and care must be used to keep the rubber cement from smearing the cabinet. Additionally, there is always the uncertainty that the gasket may become loose after a period of operation.

Accordingly, it is one object of this invention to provide a simple dustproof and water-tight enclosure which embodies a simple and effective gasket assembly.

Another object of this invention is to provide a dustproof and water-tight enclosure involving a gasket assembly which requires no gluing in its application.

A further object of this invention is to provide a dustproof and water-tight enclosure involving a gasket assembly employing mechanically interlocked parts.

An ancillary object of this invention is to provide a mechanically interlocked gasket assembly.

The foregoing statements are merely illustrative of the various aims and objects of this invention. Other objects and advantages will become apparent from a study of the following specification when considered in conjunction with the accompanying drawing, in which:

Figure 1 shows a dust-tight and waterproof cabinet assembly embodying the principles of this invention;

Fig. 2 is an enlarged sectional view taken on the line II—II of Fig. 1;

Fig. 3 is a detail of Fig. 2;

Fig. 4 is a sectional view showing a modified form of gasket assembly;

Fig. 5 is a detail of this modified gasket assembly;

Fig. 6 is a sectional view illustrating a further modification of the gasket assembly;

Fig. 7 is a detail of the illustration of Fig. 6;

Fig. 8 illustrates a manner of attaching the gasket supporting member to the cabinet;

Fig. 9 illustrates the blank from which the gasket supporting member of Fig. 6 is formed;

Figs. 10 and 11 are detail illustrations of the completed gasket supporting member, and Fig. 12 is an enlarged detail in cross-section of the gasket shown, for example, in Fig. 6.

The dustproof and water-tight enclosure illustrated in Fig. 1 comprises a main enclosure section 1 having a front face 2 provided with an outwardly formed flange 3. The plane of the surfaces of the flange 3 being substantially normal to the plane of the opening 4 defined by the flange. An angle-shaped gasket retainer member 5 is disposed in spaced relation within the boundaries defined by the flanges 3. This angle-shaped member comprises a supporting side 6 and a gasket gripping side 7. The supporting side 6 is secured to the inner face of the front face 2 of the main enclosure section. The manner of securing is optional, but welding is preferred for this operation. When so positioned the gripping side 7 is spaced from the inner face of the flange 3 to define a channel therebetween. The gasket supporting member 5 is continuous around the inside of the flange 3, therefore providing a continuous channel. A gasket member 9, which is preferably formed of extruded neoprene having an enlarged hollow edge 11 from the back face of which a tongue 13 projects, is positioned with the tongue 13 snugly disposed within the channel defined between the side 7 of the gasket supporting member and the inner face of the flange 3. In this position, the enlarged hollow edge of the gasket strip projects from the open end of the channel, and the extremity of this enlarged hollow gasket strip defines a cover receiving edge against which a cover 15 is seated. By reference to Fig. 3, it will be noted that the side 7 of the gasket supporting member is provided with C-shaped openings 16a having a trapezoidal prong 16 projecting into the opening. This prong is pressed inwardly after positioning of the gasket 9 in the channel to engage the tongue 13 thereof and securely lock the tongue in the channel. To this end the tongue may be provided with a barbed extremity, as illustrated (see Fig. 2), which is formed by providing a groove paralleling the edge of the gasket strip defined by the extremity of the tongue. With this arrangement, the prong seats into the groove and prevents the tongue from being withdrawn from the channel. Alternatively, the tongue may be provided without this groove and sufficient pressure applied in displacing the prong 16 to embed the prong into the gasket material. Inasmuch as the cover engaging section 11 of the gasket is cored out during manufacture, the sealing section is relatively flexible, and only a small force is required to deform the gasket for satisfactory sealing. It will be appreciated that this method of assembly of the gasket to the enclosure holds the gasket securely in place mechanically.

The gasket assembly illustrated in Figs. 1, 2 and 3 is suitable for such enclosures wherein a relatively shallow flange 3 is provided about the opening into the main section of the enclosure. For enclosures having a deeper flange, such as illustrated in Figs. 4 and 5, a Z-shaped gasket retainer 17 may be utilized. In this embodiment, one surface of the Z-shaped section designated 19 is welded to the inner face of the flange 3. In this position, the gasket gripping side 21 of the Z-shaped retainer is spaced from the inner face of the flange 3, and the extremity of this side terminates substantially in the plane of the extremity of the flange 3. Thus, again a channel is defined between the gasket gripping side 21 of the Z-shaped retainer and the inner face of the flange 3. In this illustration, a modified form of gasket 20 is illustrated. This gasket is illustrated in enlarged detail in Fig. 12 and is again provided with a tongue 23 corresponding to the tongue 13 of the gasket of Figs. 1 through 3. However, the sealing section 24 of the gasket is of substantially the shape of a right triangle having the tongue 23 projecting from one side thereof and additionally having a lip 25 forming an extension of the adjacent side of the triangle and extending in the same direction as the tongue 23 but spaced therefrom to define a channel between the lip and the tongue. When the tongue is positioned in the channel defined between the gripping side 21 of the Z-shaped retainer and the inner face of the flange 3, lip 25 extends over the outer face of the flange 3 with the extremity of the flange seating in the bottom of the channel defined between the lip 25 and the tongue 23. The vertex of the triangular-shaped sealing section 24 of this gasket defines the cover seating edge against which the cover 15 is seated to seal the enclosure. The design of the sealing section of this gasket is believed to offer advantages over the gasket section of Figs. 1 through 3 in that the force exerted by the door or cover 15 in sealing the opening is directly in line with the cabinet flange, thereby affording a more positive seal of the flange in the channel between the lip and the tongue. The addition of a lip on the gasket which fits over the outside of the cabinet flange provides a more positive seal with the flange at the corners thereof about the opening.

In the embodiment illustrated in Figs. 6 and 7, the gasket retainer 27 is of channel cross section. This type of a retainer may be applied to either a shallow flange or a deep flange as will be appreciated from an inspection of the cross-sectional view of Fig. 6. The details of this channel section are illustrated with particularity in Figs. 9, 10 and 11. In Fig. 9, the blank 27a from which this channel section is formed is illustrated. This blank is formed of thin strip material having a plurality of substantially semicircular openings 28 punched therein and a plurality of the C-shaped openings 16a punched therein having the trapezoidal prongs 16 projecting into these openings. The C-shaped openings are alternately spaced with the substantially semicircular openings along the length of the strip, and the dotted lines 32 illustrate the lines along which the bends are to be made in the strip to form the channel shape.

The semicircular openings 28 are provided for the purpose of permitting the insertion of electrodes therethrough to secure the remaining side of the channel to the inner face of the flange 3. This method of assembly is illustrated in Fig. 8 wherein the stationary electrode 33 is positioned against the outer face of the flange 3, and the moving electrode 35 is inserted through one of the openings 28 to engage the inner face of the opposite side of the channel retainer. Thus, it is possible to effect a spot weld between the adjacent faces of the channel retainer and the flange 3 to secure the flange in position. It should be noted that openings 28 extend across the bight of the channel to facilitate entry of the moving electrode. This welding expedient is practiced around the entire channel retainer to securely fasten spaced portions thereof against the inner face of the flange 3. Here again, a channel is defined having its open extremity substantially in the plane of the extremity of the flange 3. The gasket illustrated in Fig. 6, in this assembly, is similar to the gasket illustrated in Fig. 4, being provided with a lip 25 which engages the outer face of the flange 3 to afford a better seal. However, in view of the triangular shape in cross section of the sealing section of the gasket, it will be appreciated that upon the application of pressure by the cover to the cover seating edge of the gasket that a gas-tight seal will be obtained between the gasket sealing section at 25a and the extremity of the flange 3 so, if desired, the lip 25 may be eliminated from this assembly, and likewise, if desired, from the assembly of Fig. 4. In order to assure a positive seal between the gasket sealing section at 25a and the edge of the flange 3, the side of the channel 27 welded to the flange 3 is of shorter length than the opposite channel side and is therefore stepped back from the edge of the flange 3 so that section 25a must seat on the edge of flange 3.

In all of the embodiments herein illustrated, the C-shaped blanked hole 16a around the retaining prong 16 is made sufficiently large to allow the blanking die punch to have a relatively large cross section. This feature minimizes die maintenance. Also, this window around the prong provides an opening for pushing the gasket down into the channel, if necessary. In all cases, the prong 16 is necked down to a smaller dimension at its base than at its extremity so that it can be easily bent into the tongue on the gasket. The substantially semicircular openings for the spot welding electrodes are made sufficiently large to accommodate standard electrodes.

It will be appreciated from an inspection of the drawing and from a consideration of the description hereinbefore made that numerous variations in details of the invention herein illustrated and described may be made without departing from the spirit and scope thereof. Accordingly, it is intended that the foregoing disclosure and the showings made in the drawings shall be considered only as illustrative of the principles of this invention and not interpreted in a limiting sense.

We claim as our invention:

A gasket assembly for positioning about an opening in an enclosure member comprising, a channel-shaped strip of sheet material having a plurality of longitudinally spaced slots in one side thereof and extending across the base thereof, alternate slots having a prong projecting toward the base of the channel-shaped strip from the edge of said slot adjacent the edge of said one side, the other side of said channel-shaped strip being adapted to be secured to said enclosure about said opening, the remaining slots in said one side permitting insertion of a tool therethrough into engagement with the other side of said channel-shaped strip for the purpose of securing said other side to the enclosure, a gasket strip, said gasket strip being of resilient material having a relatively soft enlarged section along one edge thereof and having a tongue projecting therefrom, said tongue fitting snugly into said channel with said enlarged section projecting therefrom, said tongue having a recess therein adjacent to and paralleling the edge thereof, said prongs projecting into said recess in said tongue and securing said tongue in said channel-shaped strip.

References Cited in the file of this patent

UNITED STATES PATENTS

| Number | Name | Date |
|---|---|---|
| 985,016 | Donnell | Feb. 21, 1911 |
| 1,688,458 | Eveleth | Oct. 23, 1928 |
| 1,834,031 | Machlinburg | Dec. 1, 1931 |
| 2,091,791 | Newman | Aug. 31, 1937 |
| 2,093,727 | Julien | Sept. 21, 1937 |
| 2,314,666 | Stoddard | Mar. 23, 1943 |
| 2,321,589 | Erland et al. | June 15, 1943 |
| 2,324,333 | Stoddard | July 13, 1943 |
| 2,359,053 | Schenitzer et al. | Sept. 26, 1944 |
| 2,586,672 | Lave | Feb. 19, 1952 |

FOREIGN PATENTS

| Number | Country | Date |
|---|---|---|
| 7,108 | Great Britain | 1912 |
| 49,085 | Netherlands | Aug. 15, 1940 |
| 178,144 | Switzerland | Nov. 16, 1935 |
| 191,485 | Switzerland | Dec. 1, 1937 |
| 518,687 | Great Britain | Mar. 5, 1940 |